United States Patent [19]

Blair

[11] 4,119,763

[45] Oct. 10, 1978

[54] ANTI-CORROSION WELDABLE COATINGS

[75] Inventor: Noel D. Blair, Grand Island, N.Y.

[73] Assignee: Hooker Chemicals & Plastics Corp., Niagara Falls, N.Y.

[21] Appl. No.: 671,190

[22] Filed: Mar. 29, 1976

Related U.S. Application Data

[60] Continuation-in-part of Ser. No. 510,086, Sep. 27, 1974, abandoned, which is a division of Ser. No. 245,384, Apr. 19, 1972, Pat. No. 3,884,705.

[51] Int. Cl.$^2$ .................. B32B 15/18; B32B 15/02; B32B 15/16
[52] U.S. Cl. .................. 428/563; 428/328; 428/450; 428/469; 428/470; 428/560
[58] Field of Search ............... 428/328, 450, 469, 470, 428/560, 563

[56] References Cited

U.S. PATENT DOCUMENTS

| | | | |
|---|---|---|---|
| 3,530,569 | 9/1970 | Wilson | 106/14 X |
| 3,562,124 | 2/1971 | Leon et al. | 428/328 X |
| 3,690,940 | 9/1972 | Yamagishi et al. | 106/1 X |
| 3,791,850 | 2/1974 | Deshay et al. | 428/328 |

*Primary Examiner*—James R. Hoffman
*Attorney, Agent, or Firm*—Peter F. Casella; William J. Crossetta, Jr.

[57] ABSTRACT

A composition suitable for the protection of corrodible metal surfaces which comprises a binder and a filler. The filler is constituted of a mixture of a comminuted refractory ferro alloy and a non-metallic inhibitor such as zinc chromate or zinc yellow, the latter being present in an amount sufficient to enhance the corrosion protection and weldability of the coated metal surfaces. Various binders, both inorganic and organic, may be used and the filler is preferably a mixture of a major amount of ferrophos ($Fe_2P$) and a minor amount, e.g., about 10 percent by weight of the filler, of zinc yellow.

23 Claims, No Drawings

ANTI-CORROSION WELDABLE COATINGS

This is a continuation-in-part of Ser. No. 510,086 filed Sept. 27, 1974 now abandoned, which was a divisional of Ser. No. 245,384, filed Apr. 19, 1972 now U.S. Pat. No. 3,884,705 issued May 20, 1975.

This invention relates to an improved composition for providing corrosion resistance and more particularly, it relates to a composition for providing excellent corrosion protection for weldable metallic surfaces.

BACKGROUND OF THE INVENTION

Heretofore, various compositions have been proposed to provide protection for corrodible metallic surfaces. In recent years, considerable attention has been directed to compositions and systems for providing cathodic corrosion protection for metallic structures. Such systems and compositions are applicable for protecting underground pipes, storage tanks and the like, as well as metallic surfaces in contact with water, such as ship hulls, support structures for drilling rigs, docks, and the like.

In general, such systems or compositions utilize either an external source of electrical current which maintains the surface to be protected cathodic, or the corrosion protection composition itself forms an internal battery with the metal surface to be protected. In these latter systems, the coatings contain metal particles which are more anodic than the metal surface to be protected, and thus act as sacrificial anodes. In the most common coatings of this latter type, the composition is constituted by a binder and a filler. The binder may be any suitable organic or inorganic binder material and the filler is constituted by conductive metal particles which are more anodic than the metal which is to be protected. Most frequently, the metal particles of such coatings are zinc particles.

While such coating compositions have recently been used to a considerable extent, it has been found that the metal particles, such as zinc dust or powder, add greatly to the cost of such composition. Moreover, it is frequently necessary to utilize appreciable amounts of this relatively expensive metallic filler, e.g. 80% or more by weight of the total composition in order to provide the requisite corrosion protection of the metal surface.

The problem of the high cost of the metallic filler was solved by the replacement of a substantial portion thereof with a comminuted refractory ferroalloy for example ferrophosphorus. As disclosed in U.S. Pat. No. 3,562,124, it was found that at least about 3% and preferably from about 10 to about 85% of the zinc, or other conductive metal particles can be replaced by the comminuted particles of a refractory ferroalloy and that the resulting composition is not only less expensive than the conventional zinc rich coating composition but also in most instances, possesses enhanced corrosion protection effectiveness. It has been found however that the metal substrates coated with the prior art corrosion resistant coatings can be welded effectively only with some difficulty. That is to say, the areas proximate to the weld are no longer protected from corrosion, the continuity of the weld is poor and the electrode life is relatively short.

Inasmuch as these coating compositions are designed for use in connection with underground pipes, storage tanks and the like wherein the pipes and appurtenances are welded in place, it can be seen that the coated pieces should be weldable as well as protected from corrosion.

OBJECTS OF THE INVENTION

It is therefore a principle object of the present invention to provide a corrosion protection composition for corrodible metal surfaces which composition provides corrosion protection for the metal substrates and permits the coated substrates to be welded without substantial destruction of the corrosion resistant coating.

A further object of this invention is to provide an improved corrosion protection composition for corrodible metallic surfaces which can be welded, which composition is less expensive than the presently used zinc rich coating material.

These and other objects of the present invention will become apparent to those skilled in the art from the description of the invention which follows.

SUMMARY OF THE INVENTION

Pursuant to the above objects, the present invention includes a composition suitable for the protection of corrodible metallic surfaces which comprises a binder and a filler, the filler being present in an amount sufficient to impart corrosion resistant characteristics to the composition and being constituted by a mixture of a comminuted refractory ferro alloy and a non-metallic anodic corrosion inhibitor. With this composition, it has been found that by replacing a portion or all of the zinc particles in the conventional zinc-rich coating composition with a comminuted refractory ferro alloy, the corrosion protection obtained is at least equal to that when using all zinc, and frequently is improved. Moreover, it has also been found that the coating is weldable, i.e., the resultant coated metal substrate can be welded without substantial destruction of the corrosion resistance imparted to the metal by the refractory ferro alloy - non metallic inhibitor mixture in the area of the weld.

More specifically, in the practice of the present invention, the composition for protecting corrodible metallic surfaces contains the binder in an amount which is desirably within the range of about 3 to 80% by weight of the composition and preferably in an amount which is within the range of about 3 to 50% by weight of the composition. Various binder materials, both organic and inorganic may be used, the choice of a particular binder being dependent upon the characteristics which are desired for the protective coatings in each particular instance. Thus, for example, the binder used may include various synthetic resins, such as epoxies, chlorinated rubber, polystyrene, polyvinyl butyral resins, polyvinyl acetate resins, silicones, and the like. Additionally, inorganic binders may also be used, including those obtained from silicates, such as the alkali metal silicates such as sodium silicates, phosphates, hydrolyzed ethyl silicates, butyltitanates and the like. It is believed that the use of these and other similar binder materials will be apparent to those skilled in the art so that the particular binder suitable in each instance can be selected for use in the composition of the present invention.

In addition to the binder, the present composition also contains a filler, which filler is present in an amount sufficient to impart corrosion resistant characteristics to the composition. Typically, the filler is present in an amount of at least 20 to 97% by weight of the total composition, with amounts within the range of about 40 to 93% by weight of the composition being preferred. As has been noted hereinabove, because of the widely differing characteristics of the binder materials which may be used, the amount of filler used in each instance, in order to impart corrosion protective and weldability properties to the composition, may in some instances, be more or less than the typical amounts which have been indicated hereinabove. It is believed, however, that those skilled in this art will readily be able to determine the amount of filler required in each instance to impart the desired corrosion protection and welding characteristics to the composition.

The filler portion of the present composition comprises a major amount of comminuted particles of a refractory ferro alloy and a minor amount of a non-metallic inhibitor. The comminuted ferro alloy is present in the filler composition in an amount which may be from about 60 to 99 percent of the filler in the composition, and is desirably present in an amount of at least about 80% by weight of the filler. Preferably, the comminuted refractory ferro alloy is present in an amount within the range of about 85 to 95% by weight of the filler portion of the present composition.

The filler composition comprises also a minor proportion of a non-metallic corrosion inhibitor. These inhibitors function to reduce the aggressiveness of the environment towards the metal by hindering the corrosion reactions. That is, they reduce the probability of the occurrence of those reactions or reduce the rate of attack or possibly both. The non-metallic inhibitors include those containing oxidizing anions such as chromates, nitrites and the like and non-oxidizing anions containing oxygen such as phosphates, molybdates, tungstates, silicates, benzoates and the like.

As typical examples of the non-metallic inhibitors the following may be cited:

zinc chromate
zinc yellow (a pigment having the composition $4ZnO \cdot 4CrO_3 \cdot K_2O \; 3H_2O$)
lead silico-chromate
zinc molybdate
iron phosphate
potassium dichromate
sodium phosphate
calcium tungstate
aluminum silicate
zinc pyrophosphate
lithium dichromate
aluminum benzoate
stannous nitrite Mixtures of these and equivalent materials are included also.

The non-metallic inhibitor is present in only minor amounts preferably less than 40 percent by weight. At least about one percent by weight is used and preferably from about five to about fifteen percent by weight of this component is present in the novel composition.

The compositions of the invention may contain, also, small amounts of conductive metal particles which are more anodic than the metal substrate to be protective and welded. It has been found, surprisingly, that substantial amounts, that is more than about 10 percent by weight of the filler mixture adversely affects the weldability of the coated metal. Accordingly, only small amounts, that is from 0 to about 10 percent of these metal particles should be present in the compositions of the present invention. As is well known in this art, zinc particles produce excellent results on iron and steel, from the view point of corrosion protection and for this reason zinc particles, are generally preferred.

Other metal particles may be used, however, such as aluminum, magnesium, and the like, as well as particles of metal alloys, so long as these metal particles are electrically conductive and more anodic than the metal of the substrate which is to be protected.

The comminuted refractory ferro alloy, which constitutes the major portion of the filler of the present composition, may be any of the various known refractory ferro alloys. Such refractory ferro alloys incoude ferromanganese, ferromolybdenum, ferrosilicon, ferrochrome, ferrovanadium, ferrozirconium, ferrotitanium, ferrotungsten, ferroboron, ferrophosphorus, iron carbide, and the like. Additionally, the refractory ferro alloys containing more than two metallic elements, such as magnesium-ferrosilicon, ferrochrome-silicon, Siminal (containing about 20% each of silicon, magnesium and aluminum with the balance being iron), and the like, may also be used. The refractory ferro alloys which are especially suitable for use in the composition of the present invention are those materials which are electrically conductive, brittle, and which are substantially unreactive in water, dilute acidic or alkaline solutions. Of the various refractory ferro alloys indicated hereinabove, in many instances, the preferred material has been found to be ferro-phosphorus. This refractory ferro alloy is an iron phosphide composition, generally containing from about 20 to 28% by weight of phosphorus and corresponding to a mixture of $Fe_2P$ and $FeP$. The principal impurities occuring in ferrophosphorus are silicon, vanadium, chromium, nickel and manganese, as well as trace amounts of other elements. Of these, silicon and manganese are the major impurities, typically being present in amounts up to about 7% by weight. Ferrophosphorus is a by-product in the commercial manufacture of elemental phosphorus by the electric furnace reduction of phosphate ores, the iron present in the phosphate ores forming the iron phosphide material.

As has been noted hereinabove, the non-metallic inhibitor and the comminuted refractory ferro alloy which essentially constitute the filler portion of the composition of the present invention are in finely divided form. Desirably, the inhibitor particles, such as zinc yellow, have an average size within the range of about 2 to 10 microns and preferably within the range of about 5 to 7 microns. Desirably, the particles of the comminuted refractory ferro alloy such as ferro phosphorus, have an average size within the range of about 1 to 10 microns, and preferably are within the range of about 1 to 5 microns.

The non-metallic inhibitor particles and the refractory ferro alloy may be subjected to any suitable crushing and/or grinding operation in order to obtain products having particles sizes within the desired ranges as have been indicated hereinabove. In the case of the refractory ferro alloys, it has frequently been found that improved results, in terms of enhancement of the corrosion protection, are obtained by cleaning the refractory ferro alloy after the crushing and/or grinding operation. This cleaning is desirably effected by washing the ground refractory ferro alloy, such as ferro phosphorus, with an aqueous acidic solution, preferably an aqueous solution of hydrochloric acid. Typically, the hydrochloric acid solution used as a concentration within the range of about 1.0 to 12.0% and the ground refractory ferro alloy is washed with this solution for a period sufficient to form an activated surface on the refractory ferro alloy. In general, washing times of from about 1 to 4 hours are typical. It is to be appreciated, of course, that the washing time will vary in each instance, and depending upon the amount and degree of contact which can be obtained with the ferro alloy particles, may be much less than those typical times given hereinabove. Thereafter, the refractory ferro alloy may be rinsed with water to remove any residual acid and then dried before being admixed with the conductive metal particles to form the filler portion of the present composition.

Although it is not known for certain, it is believed that in the grinding operation to attain the desired particle size of the refractory ferro alloy, the surface of the refractory ferro alloy particles becomes passivated in some manner. The above described acid washing of the ground particles thus serves to reactivate the surfaces of the ferro alloy particles so that the maximum benefit may be obtained from their inclusion in the compositions of the present invention.

The coating compositions of the present invention may be formulated by admixing the binder and resin components, in the proportions as have been set forth hereinabove, using any suitable mixing techniques. If desired, the inhibitor and the comminuted refractory ferro alloy may be added separately to the binder material or they may be premixed in the desired proportions to form the filler component which may then be admixed with the binder.

Depending upon the particular binder which is used, the composition may also contain suitable solvents, curing agents, suspending agents, plasticizers, and the like. Exemplary of suitable solvents which may be used are: xylene, toluene, mineral spirits, methanol, ethanol, butanol, isopropanol ethyl butyl ketone, methylisobutylketone, ethyleneglycol monobutyl ether, ethylene glycol monoethyl ether, ethylene glycol monoethyl ether acetate, ethyl acetate, butyl acetate, and the like.

Exemplary of suitable curing agents are the following: cobalt, lead, manganese, driers such as naphthanates, polyamines, such as triethylenetetramine, polyamide resins such as those prepared from a fatty dibasic acid and ethylene diamine, phosphoric acid, oxalic acid and the like.

Exemplary of suitable plasticizers which may be used are the following: diocyl sebacate, dioctyl phthalate, dioctyl adipate, diethylene glycol dibenzoate, castor oil, methyl recenoleate, polyesters, epoxidized soybean oil, epoxy esters tricresyl phosphate, chlorinated biphenyls, chlorinated polyphenyls, chlorinated paraffic and the like.

Typically, the solvents may be present in amounts within the range of about 5 to 60% by weight of the composition while the curing agents and plasticizers may each be present in amounts up to about 70% by weight of the composition respectively.

It is to be appreciated, of course, that the specific amounts of these components, as well as the types used, will depend in each instance upon the particular binder as well as the ultimate characteristics desired for the particular coating composition and its use.

The thus-formulated composition may then be applied to the metal substrate to be protected using any suitable techniques, as for example, by spraying, brushing, immersion, flowing, or the like. Typically, the compositions are applied so as to produce a protective coating or film having a thickness within the range of about 0.5 to 5.0 mils, although coating thicknesses which are outside of these typical ranges may also be used, depending upon the particular conditions of application and intended use in each instance. Desirably, this film will be made up of the binder in an amount of about 3-70% by weight, and preferably about 7-50% by weight and the filler in an amount of about 30-97% by weight, and preferably about 50-93% by weight. Following the application of the coating to the metal substrate to be protected, drying and/or curing of the coating is effected. The type and extent of the drying or curing will vary in each instance, depending upon the specific nature of the binder material which is used in the composition. Thus, in some instances, heating may be utilized to effect drying or cure of the coating while in other instances, simple air drying or curing may be sufficient. The thus-formed coatings are found to provide excellent corrosion protection to the metal substrates to which they are applied. In this regard, it has been found that these coatings are useful in providing protection on a variety of metal substrates, including substrates of ferrous metal, copper, and the like. As has been previously noted, depending upon the particular metal substrate to be protected, the non-metallic inhibitor in the filler portion of the coating composition will be changed, so as to utilize one which is capable of functioning with the metal substrate so as to provide the desired protection.

In this regard, it is to be noted that the protective coatings of the present invention act anodically to provide the corrosion protection for the metal substrates to which they are applied. Moreover, it has been found that the presence of the comminuted refractory ferro alloy, such as ferro phosphorus, in these compositions acts to enhance the anodic corrosion protection afforded by the non-metallic inhibitor of the composition. Although the exact mechanism by which this enhancement is effected is not known, it is believed that in some manner, the comminuted refractory ferro alloy provides a surface on which the cathodic reaction, which takes place concurrently with the sacrificial anodic action of the inhibitor, can more easily proceed. Thus, the coatings of the present invention are found to provide excellent corrosion protection of the anodic type for numerous metal substrates in contact with corrosive media such as underground pipelines, ships hulls, off shore drilling platforms, and the like.

In order that those skilled in the art may better understand the present invention and the manner in which it may be practiced, the following specific examples are given. In these examples, unless otherwise indicated, temperatures are in degrees centigrade and parts and percents are by weight. It is to be appreciated, however, that these examples are merely exemplary of the present invention and are not to be taken as a limitation thereof.

EXAMPLES 1-6

A series of coating compositions was prepared by admixing components as indicated in the following Table.

M TABLE

| Ex. | Epoxy Resin[1] | Ferro phos | Zinc Chromate | Zinc Dust | Suspending[2] Agent | Xylol |
| --- | --- | --- | --- | --- | --- | --- |
| 1 | 200 parts | 1001 | 10.1 | 0 | 3.08 | 127.6 |
| 2 | 200 parts | 960 | 50.5 | 0 | 3.08 | 127.6 |
| 3 | 200 parts | 910 | 101 | 0 | 3.08 | 127.6 |
| 4 | 200 parts | 758.3 | 252.8 | 0 | 3.11 | 127.6 |
| 5 | 200 parts | 758.3 | 0 | 252.8 | 3.11 | 127.6 |

M TABLE-continued

| Ex. | Epoxy Resin[1] | Ferro phos | Zinc Chromate | Zinc Dust | Suspending[2] Agent | Xylol |
|---|---|---|---|---|---|---|
| 6 | 200 parts | 0 | 0 | 1010.1 | 3.11 | 127.6 |

Legend:
[1] The epoxy resin was a commercially available epoxy resin identified as a 50 percent solution of 40 percent soya fatty acids and 60 percent of diglycidyl ether of bisphenol A in xylol having a viscosity of W-Y (Gardiner)
[2] The suspending agent was a commercially available thixotropic agent, Thixotrol ST, product of Baker Castor Oil having a density of 8.47 lbs/gal at 25° and a sp. gr of 1.021 at 25°/25°.

Each of the above compositions was admixed with 0.5 part of 6 percent cobalt naphthanate and 24 percent lead naphthanate dissolved or suspended in a mineral spirits solvent.

Thereafter standard 3 inch by 5 inch steel panels were coated with the coating compositions and the coatings cured at room temperature at 50 percent relative humidity for several days. The coated panels were tested for corrosion resistance by subjecting them to the known salt fog exposure test (ASTM B-117) for a maximum of 500 hours.

The panels coated with the compositions of Experiments 1 to 4, after 500 hours, showed no rusting or blisters. In Experiment 5, after 48 hours, rust appeared on the coated panel and after 96 hours blisters formed.

The panel coated with the composition of Experiment 6, although it endured 500 hours exposure without rusting showed some blistering after 288 hours of exposure, and hence was considered to be somewhat inferior in this respect to the coatings of Experiments 1 to 4.

The coating compositions of Experiments 3 and 6 were used to coat cold rolled steel test panels, 4 inch by 12 inch, by spraying. Films of 3± 0.3 mils thickness were applied and air dried for about 72 hours at 72°± 5° F. Both sides of the panels were coated and then two panels were placed face to face. Sets of two panels provided a welding assembly sufficient that a series of 2000 consecutive spot welds could be made using a 75 KVA Taylor Winfield Spot Welder using the following weld schedule.

550 lbs — Electrode Force
12 cycles — Weld Time
12,500 amps — Secondary Current
0.25 inch — Diameter of copper electrodes.

The panels coated with the formulation of Experiment 3 gave welds with a tensile shear strength of 1016 lbs. and a nugget size of 0.173 inch. No electrode wear was evident. By contrast the panels coated with the formulation of Experiment 6 (100% zinc dust as the filler) would not weld under these conditions.

EXPERIMENTS 7-10

A series of coating compositions were prepared by admixing the several components in the amounts indicated in the following table:

TABLE I

| Experiment | 7 | 8 | 9 | 10 |
|---|---|---|---|---|
| Component | | | | |
| Resin Binder[1] | 200 | 200 | 200 | 200 |
| $Fe_2P$ (23.4% P) | 910.0 | 910.0 | 910.0 | 910.0 |
| Basic Zn Chromate | 101.0 | 91.0 | 50.6 | 10.1 |
| Zn Dust | 0 | 10.1 | 50.6 | 91.0 |
| 6% Co Naphthenate | 0.50 | 0.50 | 0.50 | 0.50 |
| 24% pB Naphthenate | 1.25 | 1.25 | 1.25 | 1.25 |
| Suspending Agent[2] | 3.14 | 3.13 | 3.11 | 3.08 |
| Xylene | 127.6 | 127.6 | 127.6 | 127.6 |
| PVC[3] | 63.60 | 63.43 | 62.78 | 62.09 |
| Initial Viscosity[4](Sec) | 180 | 150 | 219 | 93.0 |
| Non Volatiles | 82.9 | 83 | 83 | 83 |

Legend:
[1] The binder was a commercially available epoxy ester resin composition containing about 40 percent soya fatty acids and 60 percent of diglycidyl ether of bisphenol A as a 50 percent solution in xylol having a viscosity (Gardiner) of W-Y.
[2] The suspending agent was a commercially available thixotropic agent, Thixotrol ST, a product of Baker Castor Oil Company, having a density of 8.47 pounds/gallon and a specific gravity of 1.081 at 25°/25°.
[3] Pigment concentration by volume
[4] Number 4 cup Ford Viscosity.

In these experiments, the same basic formulation was used and only the relative proportion of zinc chromate and zinc dust was varied from 10 percent to 0 percent and 0 percent to 10 percent while holding the ferrophos content constant at about 90 percent of the pigment mixture.

These formulations were applied by spraying on 4 inch by 12 inch steel panels. Two types of steel test panels were coated. One group of panels had been treated with an alkali metal phosphate solution whereas the other type was the conventional cold rolled low carbon steel test panel. The panels prepared for evaluation of the corrosion resistance properties were coated with films of 1.5 to 2.0 mils and those prepared for testing of the weldability were coated with film of 2.5 to 3.0 mils.

The former panels were air dried for at least 72 hours and then baked for 45 minutes at 275 degrees Fahrenheit. The latter panels were air dried for 96 hours prior to evaluation of weldability.

The dry to touch, tack free, and dry hard times were determined for all formulations on films laid down on cold rolled steel panels.

The physical properties of these films are set out in the following table.

TABLE II

| Exp. | $Fe_2P$ % | Basic Zn $CrO_3$ | Zn Dust | Dry to[2] Touch Min. | Reverse Impact in lbs. | Knife Adhesion[5] | Film Resist. Megohms | Salt Blister hrs. | Fog[3] Rust hrs. | 5% NaCl[4] Immersion Blister hrs. | Rust hrs. | Nugget Size in. | Weldability[1] Tensile Shear lbs. | Elect. Wear Thousands |
|---|---|---|---|---|---|---|---|---|---|---|---|---|---|---|
| 7 | 90 | 10 | 0 | 3 | 150 | 5 | 0.110(B) | 500 | 240 | 336 | 72 | .052 | 914 | +1.5 |
|  |  |  |  |  |  |  | (C) | 500 | 24 | 312 | 24 | .086 | 1233 | 2 |
| 8 | 90 | 9 | 1 | 3 | 150 | 4 | 0.085(B) | 500 | 326 | 336 | 216 | .197 | 1187 | 0 |
|  |  |  |  |  |  |  | (C) | 500 | 24 | 312 | 72 | .173 | 1293 | +1 |
| 9 | 90 | 5 | 5 | 3 | 150 | 4 | 0.055(B) | 500 | 326 | 336 | 336 | .035 | 993 | 1 |
|  |  |  |  |  |  |  | (C) | 500 | 24 | 312 | 48 | .146 | 1147 | +1 |
| 10 | 90 | 1 | 9 | 3 | 150 | 6 | 0.053(B) | 500 | 326 | 336 | 336 | .052 | 1183 | +1 |

TABLE II-continued

| Exp. | Fe₃P % | Basic Zn CrO₃ | Zn Dust | Dry to Touch Min.[2] | Reverse Impact in lbs. | Knife Adhesion[5] | Film Resist. Megohms | Salt Blister hrs. | Fog Rust hrs.[3] | 5% NaCl[4] Immersion Blister hrs. | Rust hrs. | Nugget Size in. | Weldability[1] Tensile Shear lbs. | Elect. Wear Thousands |
|---|---|---|---|---|---|---|---|---|---|---|---|---|---|---|
| (C) | | | | | | | | 168 | 24 | 168 | 48 | .151 | 1225 | 0 |

Legend:
(B) - Alkali metal phosphate treated test panels
(C) - Cold rolled low carbon steel test panels
[1] Weldability evaluated using: electrode force of 500 lbs. Weld time of 5 cycles (secondary current of 10,000 amps). A 75 KVA Taylor Winfield Resistance Spot Welder fitted with Ford Type IVA 26B copper electrodes was used.
[2] Dry time measured using a Gardiner circular dry time recorder.
[3] ASTM B-117 (500 hrs. limit of test - No blisters or rust appeared. Data less than 500 hrs. indicate period of which blisters or rust appeared and test discontinued).
[4] ASTM D-870 modified to use 5% sodium chloride dissolved in deionized water, maintained at 100° F. Duration of test was 336 hours.
[5] Rating Scale: Excellent - 10; Good - 8; Fair - 6; Poor - 4; Very Poor - 2

It is to be appreciated that in some instances the refractory ferro alloys of the present compositions may be replaced by other, similar refractory materials which are electrically conductive, brittle, and substantially nonreactive in water, dilute alkaline or dilute acidic solutions. Typical of such materials are the carbides, nitrides, borides and silicides of titanium, zirconium, vanadium, niobium, tantalum, chromium, molybdenum, tungsten, thorium and hafnium, silicon carbides, as well as phosphides of boron, cadmium, calcium, chromium, cobalt, manganese, molybdenum, nickel, tantalum, thorium, tin, titanium, tungsten, vanadium, zirconium, and the like.

While there have been described various embodiments of the invention, the compositions and methods described are not intended to be understood as limiting the scope of the invention as changes therewithin are possible and it is intended that each element recited in any of the following claims is to be understood as referring to all equivalent elements for accomplishing substantially the same results in substantially the same or equivalent manner, it being intended to cover the invention broadly in whatever form its principle may be utilized.

I claim:

1. A weldable article having a metal surface, coated with a composition which comprises about 3 to about 80 percent by weight of a binder and about 20 to about 97 percent by weight of a filler, the filler being comprised of a major amount of a comminuted refractory ferro alloy and a minor amount of a non-metallic corrosion inhibitor selected from the group consisting of chromates, nitrites, phosphates, molybdates, tungstates, silicates and benzoates.

2. The article of claim 1 wherein the comminuted refractory ferro alloy is selected from ferromanganese, ferromolybdenum, ferrosilicon, ferrochromium, ferrovanadium, ferrozirconium, ferrotitanium, ferrotungsten, ferroboron, ferrophosphorus and iron carbide.

3. The article of claim 1 wherein the comminuted non-metallic corrosion inhibitor is selected from zinc chromate, zinc yellow, lead silicon-chromate, zinc molybdate, iron phosphate, potassium dichromate, sodium phosphate, calcium tungstate, aluminum silicate, zinc pyrophosphate, lithium dichromate, aluminum benzoate, stannous nitrite and mixtures thereof.

4. The article of claim 3 wherein the non-metallic corrosion inhibitor is selected from zinc chromate and zinc yellow.

5. The article of claim 4 wherein the non-metallic corrosion inhibitor has an average particle size within the range of about 2 to 10 microns.

6. The article of claim 1 wherein the filler includes zinc metal particles in an amount less than that which will substantially detrimentally affect weldability.

7. The article of claim 6 wherein the zinc metal particles comprise up to about 10 percent by weight of filler.

8. A weldable article having a metal surface coated with a composition which comprises about 3 to about 80 percent by weight of a binder and about 20 to about 97 percent by weight of a filler, the filler being comprised of a major amount of a comminuted refractory ferro alloy selected from ferromanganese, ferromolybdenum, ferrosilicon, ferrochromium, ferrovanadium, ferrozirconium, ferrotitanium, ferrotungsten, ferroboron, ferrophosphorus and iron carbide and a minor amount of a non-metallic corrosion inhibitor selected from zinc chromate, zinc yellow, lead silicon-chromate, zinc molybdate, iron phosphate, potassium dichromate, sodium phosphate, calcium tungstate, aluminum silicate, zinc pyrophosphate, lithium dichromate, aluminum benzoate, stannous nitrite and mixtures thereof.

9. The article of claim 8 wherein the filler includes zinc metal particles in an amount less than that which will substantially detrimentally affect weldability.

10. The article of claim 9 wherein the zinc metal particles comprise up to about 10 percent by weight of the filler.

11. The article of claim 8 wherein the binder constitutes from about 3 to about 50 percent by weight and the filler is present in an amount within the range of about 40 to about 93 percent by weight.

12. The article of claim 8 wherein the comminuted refractory ferro alloy is present in the amount of from about 60 to 99 percent by weight of the filler.

13. The article of claim 8 wherein the non-metallic corrosion inhibitor is present in an amount within the range of from about 1 to about 40 percent by weight of the filler.

14. The article of claim 13 wherein the non-metallic corrosion inhibitor is selected from zinc chromate and zinc yellow.

15. The article of claim 14 wherein the non-metallic corrosion inhibitor has an average particle size within the range of about 2 to 10 microns.

16. The article of claim 8 wherein the refractory ferro alloy is ferro phosphorus.

17. The article of claim 16 wherein the ferrophosphorus has an average particle size within the range of about 1 to 10 microns.

18. A method of forming a weldable corrosion protective coating on a metal substrate which comprises contacting the metal substrate with a composition which comprises about 3 to about 80 percent by weight of binder and about 20 to about 97 percent by weight of a filler, the filler being comprised of a comminuted refractory ferro alloy and a minor amount of a non-metallic corrosion inhibitor selected from the group consisting of chromates, nitrites, phosphates, molybdates, tungstates, silicates and benzoates, and forming a coating of said composition on the substrate.

19. The method of claim 18 wherein the refractory ferro alloy is selected from ferromanganese, ferromolybdenum, ferrosilicon, ferrochromium, ferrovanadium, ferrozirconium, ferrotitanium, ferrotungsten, ferroboron, ferrophosphorus and iron carbide and the non-metallic corrosion inhibitor is selected from zinc chromate, zinc yellow, lead siliconchromate, zinc molybdate, iron phosphate, potassium dichromate, sodium phosphate, calcium tungstate, aluminum silicate, zinc pyrophosphate, lithium dichromate, aluminum benzoate, stannous nitrite and mixtures thereof.

20. The method of claim 19 wherein the refractory ferro alloy is ferrophosphorus and the non-metallic corrosion inhibitor is selected from zinc chromate and ainc yellow.

21. The method of claim 20 wherein the comminuted refractory ferro alloy is present in an amount within the range of about 85 to 95 percent by weight of the filler and has an average particle size within the range of 1–10 microns.

22. The method of claim 19 wherein the refractory ferro alloy is ferrophosphorus and the non-metallic corrosion inhibitor is zinc chromate.

23. The method of claim 18 wherein the filler includes less than about 10 percent by weight of zinc metal particles.

* * * * *